US006373521B1

(12) United States Patent
Carter

(10) Patent No.: US 6,373,521 B1
(45) Date of Patent: Apr. 16, 2002

(54) AIRCRAFT INCIDENT SURVEILLANCE SYSTEM

(76) Inventor: Kevin D. Carter, P.O. Box 8944, Waco, TX (US) 76714

( * ) Notice: Subject to any disclaimer, the term of this patent is extended or adjusted under 35 U.S.C. 154(b) by 7 days.

(21) Appl. No.: 09/619,070

(22) Filed: Jul. 19, 2000

(51) Int. Cl.[7] .......................... H04N 7/18; H04N 9/47

(52) U.S. Cl. .......................... 348/144; 244/17.15

(58) Field of Search .......................... 348/143, 144, 348/146, 150, 159, 36, 37, 39; 360/5; 244/17.15, 2, 6, 7 A, 8, 17.11, 122 A, 138 A; H04N 7/18, 9/47

(56) References Cited

U.S. PATENT DOCUMENTS 4,913,377 A * 4/1990 Eickmann ................ 244/17.15
5,374,012 A * 12/1994 Marchand et al. .......... 348/144
5,752,088 A * 5/1998 Desselle ..................... 348/144
5,894,323 A * 4/1999 Kain et al. .................. 348/144
6,069,654 A * 5/2000 Moynihan ................... 348/144
6,211,907 B1 * 4/2001 Scaman et al. ................ 360/5

* cited by examiner

*Primary Examiner*—Nhon T Diep
(74) *Attorney, Agent, or Firm*—David G. Henry

(57) ABSTRACT

The invention is of an aviation incident surveillance system which is to be carried on-board aircraft and stand ready at any time for deployment to visually record the final seconds of the downed aircraft. The system of the present invention centers on a rotocraft capsule which suspends itself approximately at an altitude at which the capsule is deployed from the distress aircraft while on-board video cameras and data recording systems record the environment surrounding the capsule which, of course, will include the aircraft from which the capsule was deployed. The capsule is provided with a self deploying, ballistic parachute system for gently landing the School upon expiration of the capsule's internal power sources for driving the rotocraft components.

4 Claims, 4 Drawing Sheets

AIRCRAFT INCIDENT SURVEILLANCE SYSTEM

BACKGROUND OF THE INVENTION

1. Field of the Invention

Figure 1:
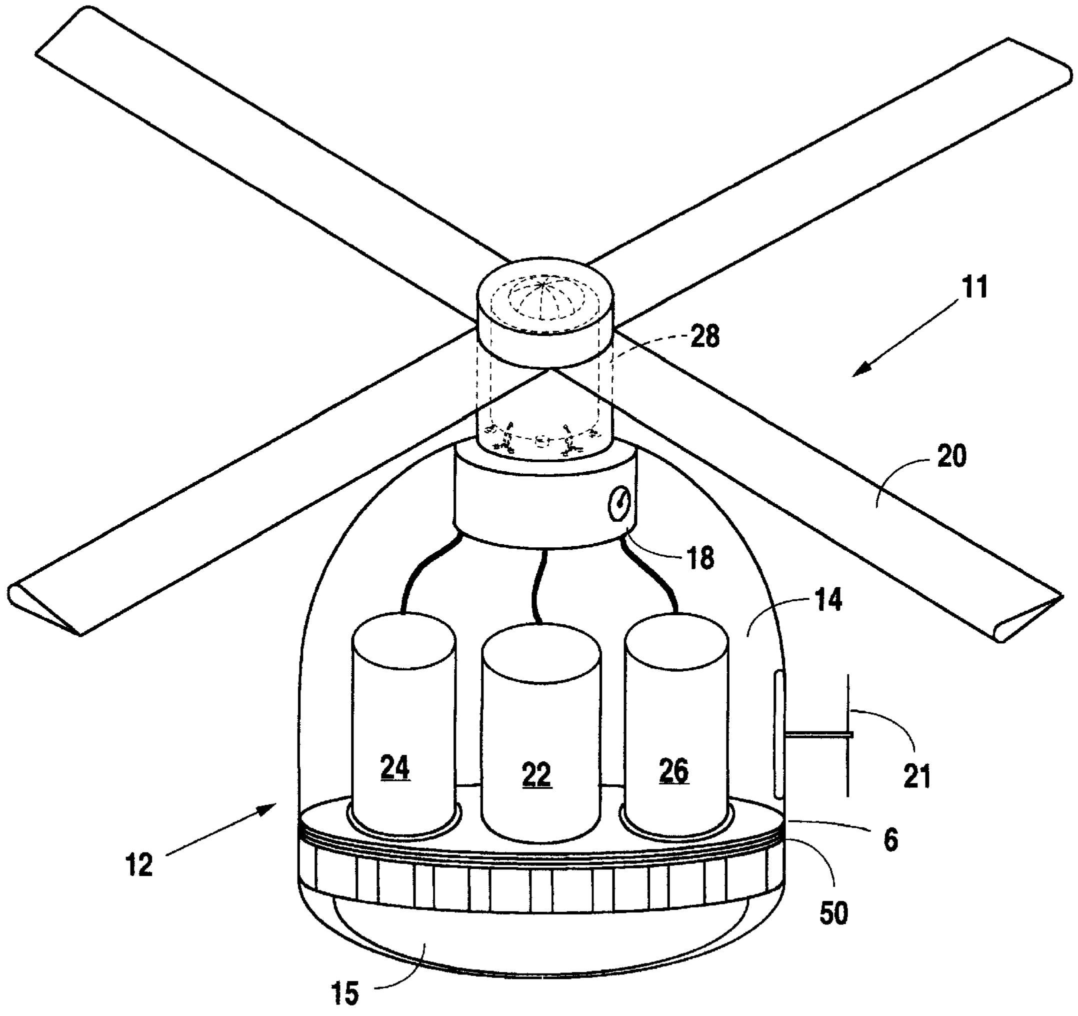

The present invention relates to video surveillance systems and to recording of information pertaining to aircraft accidents and incidents.

2. Background Information

Many recent aircraft disasters have a common thread—many questions about the final moments of the aircraft condition, trajectory, surrounding environment, etc. remain unanswered, even when the "black boxes" are recovered and are functioning. This is true, not only because flight data and voice recorders can record only so many parameters, but because none of those parameters relate to visualization, and nothing is more telling of certain circumstances than a picture. In short, we currently have no way to visually capture the scene of a doomed aircraft's final moments.

It would well advance the cause of aircraft safety through greater understanding of aircraft accidents to provide means by which the final stages of an aircraft downing are visually recorded and preserved for accident investigators. Ideally, such a system could be deployed from the aircraft, and record at a safe distance the scene of the mishap. Such a system would include means for gently "landing" itself, and for aiding searchers in locating the system after it was down. Certain embodiments can be self-deploying based on certain measured parameters, the presence of which virtually insure an aircraft downing (steep and/or spiraling dive, loss of yaw, pitch or bank control, structural failure of some major component of the airframe, etc.). For use in over-water scenarios, the surveillance system should be water tight to several atmospheres.

In view of the above, it is an object of the present invention to provide an aviation mishap surveillance system.

It is another object of the present invention to provide, via an on-board, self deploying surveillance and recording system to visually record aircraft accidents, to advance because of aviation safety by better enabling accident investigators to isolate causes of such accidents.

It is another object of the present invention to provide an aviation mishap surveillance system which, because it is carried aboard an aircraft and automatically deployed, is constantly available for recording and incident regardless of time and place.

It is another object of the present invention to provide the supplement to current "black box" technology in better providing useful information for accident investigators who seek the details of and causative factors for aviation incidents.

In satisfaction of these and related objectives, Applicant's present invention provides an aviation accident surveillance and recording system. The system of the present invention is an integrated video recording system, self powered rotary wing aircraft, and marker beacon system. The surveillance system may be manually deployed, but in most instances it is anticipated that the system will be automatically deployed when any of a number of unusual attitudes and/or unusual flight characteristics are assumed by the subject aircraft (extreme nose high or nose low pitch, entry into a spin, air speed in excess of $V_{ne}$, airframe separation, air speed less than $V_{so}$, sudden loss of pressurization, and complete loss of hydraulic pressure or otherwise attributable loss of control of flight control surfaces, for example).

The surveillance system of the present invention will include video cameras positioned and focused for recording a 360° panorama of the surrounding environment. The surveillance system has an internal battery power source which powers contour of rotating rotary blades to hold the system So aloft for several minutes as it records the surrounding environment. The video images are recorded onto on-board impact-resistant data collection systems of similar technology to the current "black boxes" on airliners and military aircraft. Certain embodiments of the present system will include infrared visualization and recording systems for gathering information and other than visible light conditions. To enable subsequent location of a deployed surveillance system capsule, the present system will include an aviation ELT transmitter as well as externally visible strobe lights.

To stabilize the system capsule during use, certain embodiments of the present invention may include direct topic stabilization systems.

The on-board battery pack of the present invention will be constantly maintained in a fully charged condition via a power interface which draws power from the aircraft electrical system.

Once surveillance systems of the present invention are put into common use, the vast majority of questions, the nature of which surround most present day aircraft losses, will be answered. Blame, whether mechanical, human, and/or meteorological will be properly and fairly allocated. In the case of mechanical malfunctions which may be discerned from the recorded information, the need for appropriate remedial actions may be or quickly recognized and undertaken. In the case of human network, any need for remedial training and pilot educational measures they likewise be more quickly recognized. In this date of increasing terrorists threats, a hideous crime may be more quickly recognized as such and proportional response may be swiftly undertaken.

DETAILED DESCRIPTION OF THE PREFERRED EMBODIMENTS

Referring to FIG. 1, the aircraft incident surveillance system of the present invention is identified generally by the reference numeral 10. System 10 includes a capsule 12 with two primary components—a protective, titanium outer case 14 and a transparent lens cover 15 through which on-board cameras view surrounding environment.

Figure 2:
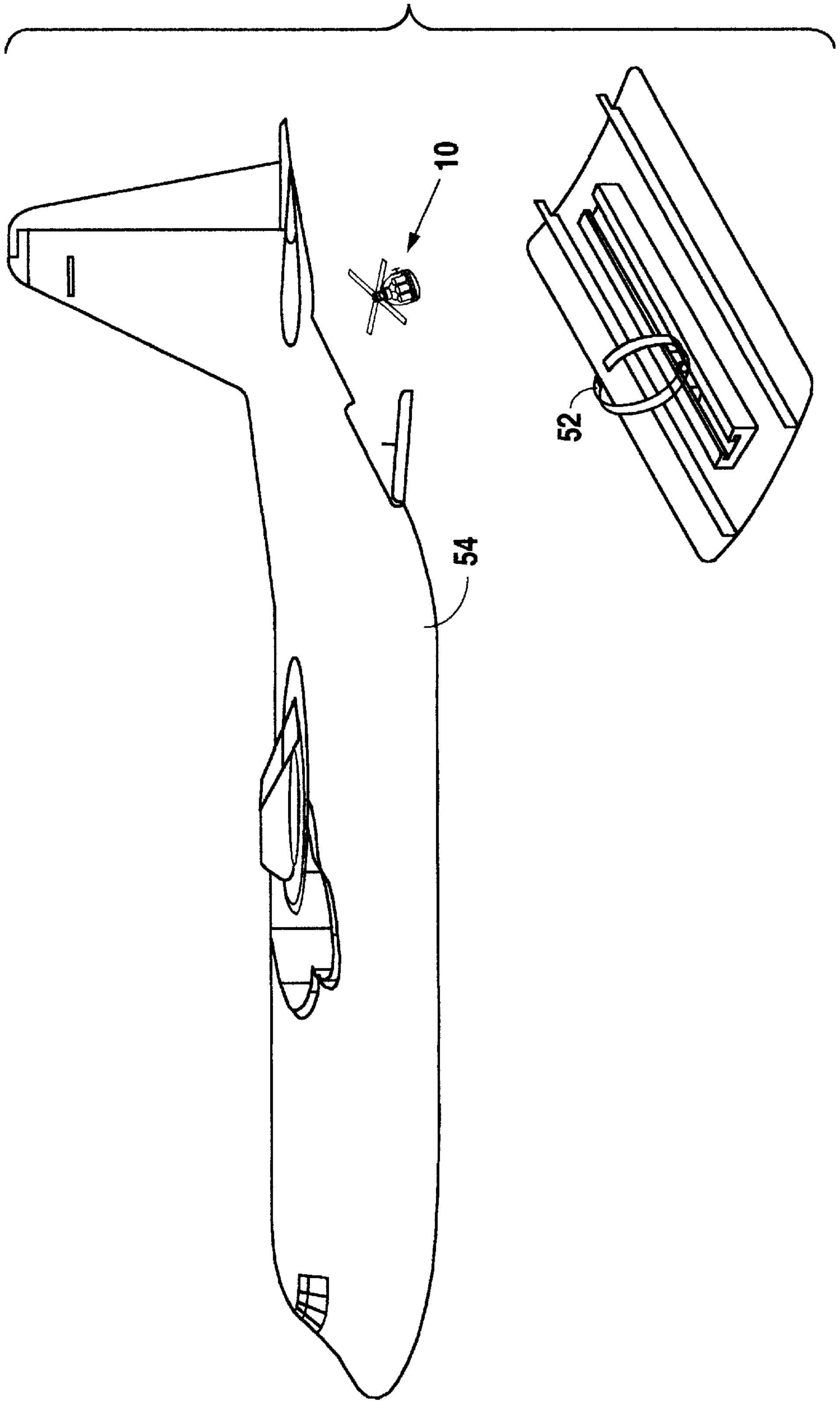

Referring in combination to FIGS. 1 and 2, to maintain the on-board battery system at a full charged state, external electrical contacts 50 electrically mate with counterpart contacts 52 within the aircraft 54 on which the surveillance system 10 is stationed. Electrical contacts 50 are situated in a power source band 16 as shown in FIG. 1.

Figure 3:
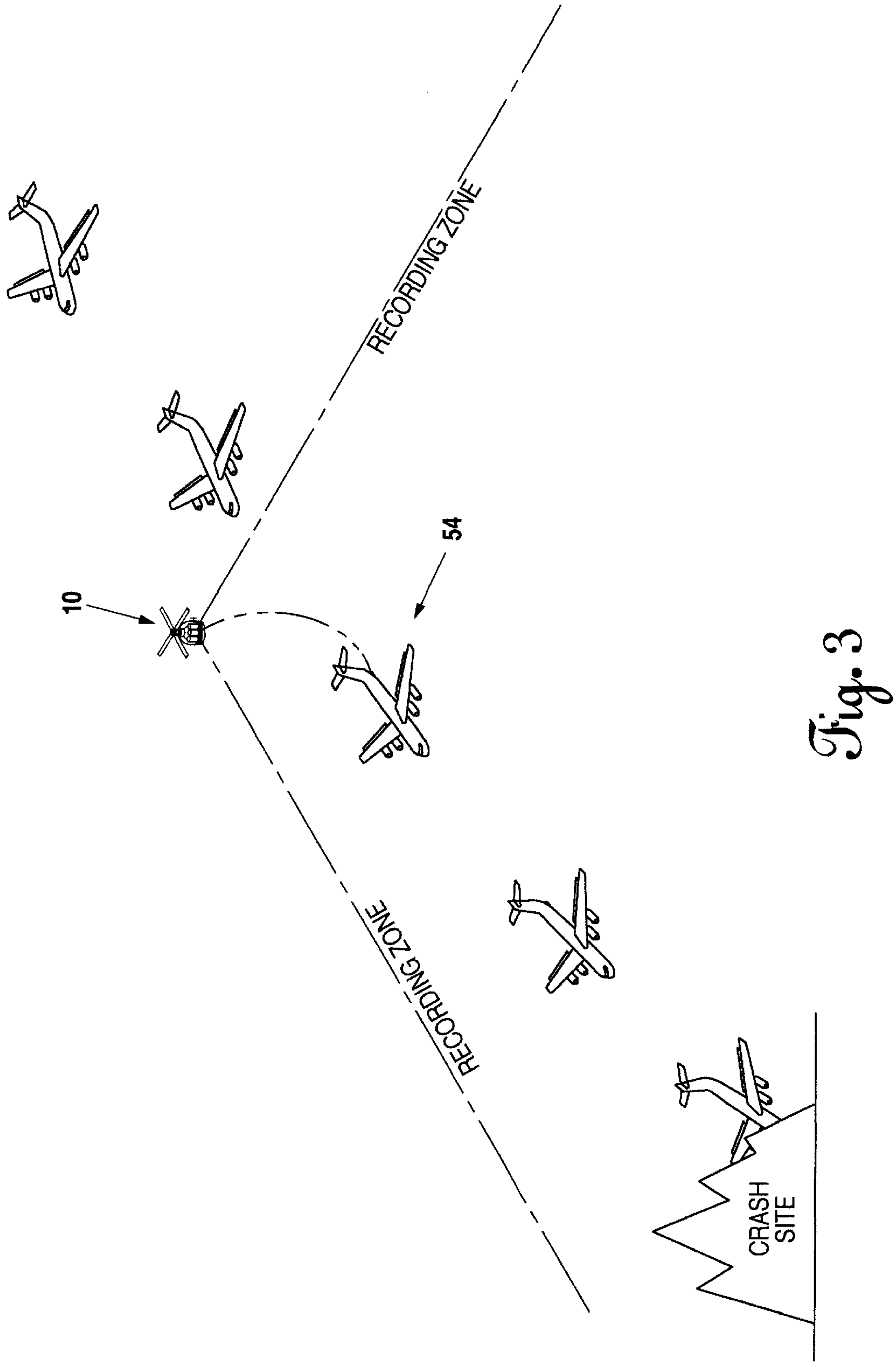

Referring principally to FIGS. 1 and 3, capsule 12 is, in addition to being a video recording platform, a rotocraft. An on-board shaft motor 18 and appropriate gear box assemblage drives contra rotating rotocraft blades 20. It is conceivable that have embodiments of the present system without contra rotating blades may be feasible if the internal video cameras are charged topic we stabilized as against the inevitable rotation of the capsule 12, but such as not the preferred embodiment. In the alternative, a rotor 21 may be provided to serve a function like that of a tail rotor of a conventional helicopter.

Referring again principally to FIG. 1, inside capsule 12 are, in the preferred embodiment, positioned three video cameras and associated data recording systems. The data recording systems are of like technology to those found in present day "black box" systems for airliners and military aircraft. A center camera 22 is configured with appropriate lenses and positioning to record a 360° "fish eye" panorama of all space beneath capsule 12. A North/East camera 24 is configured for recording a vista of approximately 180° and is, at least in one embodiment, designed for infrared detection and recording. A South/West camera 26 serves the same purpose as camera 24 for the remaining two quadrants about capsule 12.

Figure 4:
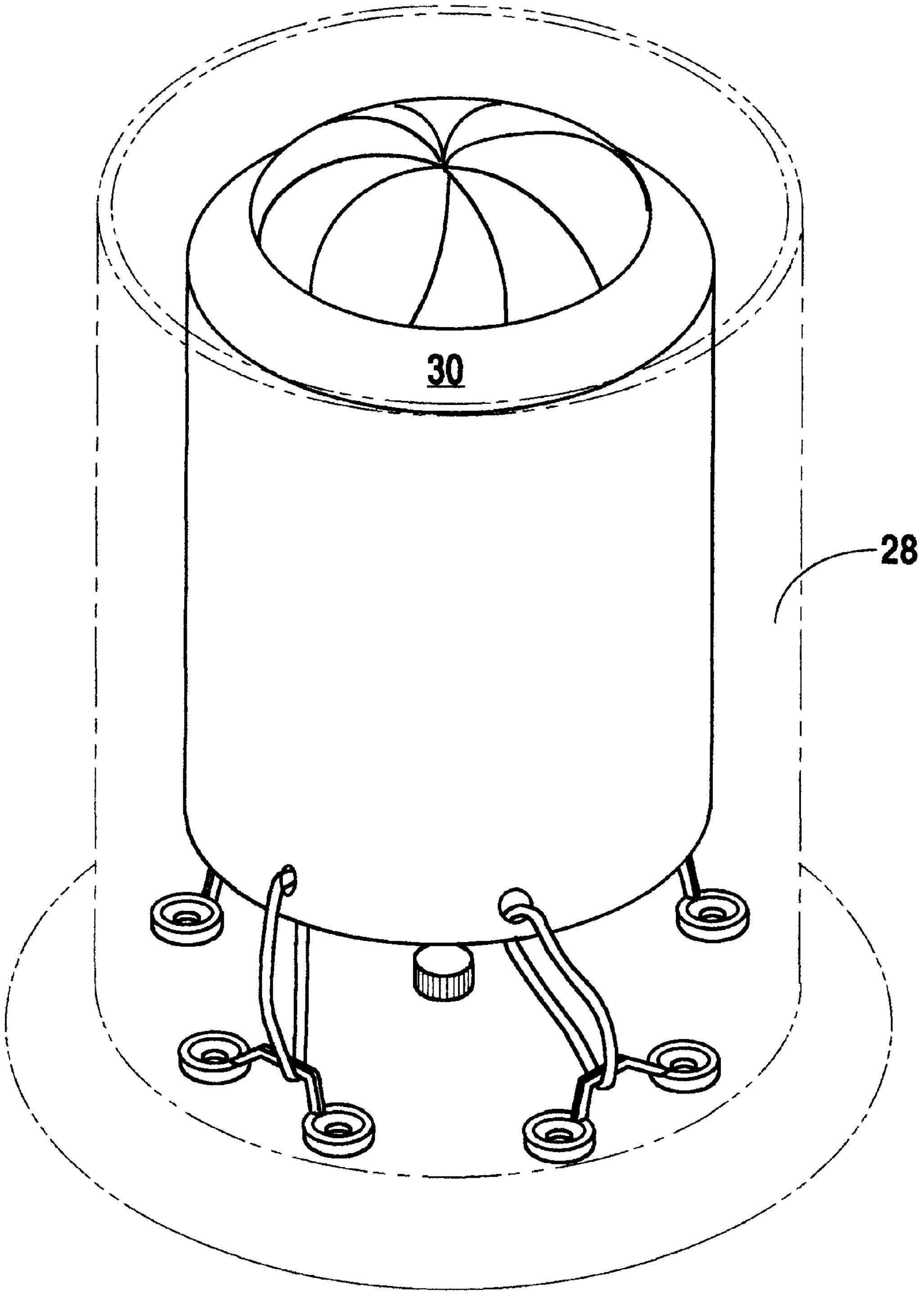

Referring in combination to FIGS. 1 and 4, shaft 28 to which blades 20 are attached, and through which blades 20 receive their power from motor/gear box 18, is not simply a solid shaft. Rather, shaft 28 is a hollow structure which houses a parachute capsule 30. Parachute capsule 30 explosively deploys its parachute once capsule battery power has all into a level that capsule 12 can no longer be suspended through action of blades 20. The triggering mechanism for such deployment, as well as the bat for the parachute capsule 30 itself, are well-known in related arts.

Although not depicted in the drawings, capsule 12 houses a conventional aviation ELT transmitter with appropriate antenna for transmitting the position of the capsule to the Air Force monitoring system and for simply alerting authorities to the fact that the system has been deployed and that an aviation incident appears to have occurred. In addition, strobe light displays are attached to capsule 12 and are activated upon deployment. Once capsule 12 has landed, the strobe lights will enable searchers to more quickly locate the capsule 12 and would be possible with mere ELT transmissions.

Because capsule 12 may be deployed other than over land, capsule 12 shall be constructed to be watertight to a depth been appropriate by aviation experts. Using recent submarine shell technology, watertight integrity of to approximately two thousand feet is believed to be feasible.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

I claim:

1. An aircraft incident surveillance system comprising:

a housing member having a protective shell component and a transparent lens member;

a video camera member mounted within said housing member and configured and position for capturing images visible through said transparent lens member;

data recording means for recording video images captured by said video camera member and for resiliently storing said images for later viewing by video player means;

a rotocraft assemblage attached to and extending from said housing member, blades of said rotocraft assemblage being driven by a motor/gear box means within said housing member under power of an internal battery power source, said rotocraft assemblage for aerodynamically suspending said aircraft incident surveillance system for a time period during which said video camera member records images through said lens member; and ballistic parachute means for facilitating a controlled dissent of said aircraft incident surveillance system upon exhaustion of said battery power source for said rotocraft assemblage.

2. The system of claim 1 further comprising second video camera means which said second video camera means are configured for recording infrared images, said second video camera means being mounted within said housing member and in relation to said lens member, or a second lens member, whereby said second video records infrared images of an environment surrounding said housing member.

3. The system of claim 1 further comprising electrical power interface means positioned externally of said housing member through which power from an aircraft on which said surveillance system is stationed is channeled to said battery power source to maintain said battery power source at a fully charged condition.

4. The system of claim 1 further comprising aircraft distress sensing means external to said housing member which, when sensing aberrant flight path or aircraft control characteristics, actuators surveillance system deployment means for automatically deploying said surveillance system to record the likely associated aircraft incident for later analysis.

* * * * *